(12) United States Patent
Kodama et al.

(10) Patent No.: US 8,626,610 B2
(45) Date of Patent: Jan. 7, 2014

(54) EQUIPMENT MANAGEMENT SYSTEM, EQUIPMENT MANAGEMENT METHOD AND PROGRAM

(75) Inventors: Ichiro Kodama, Tokyo (JP); Hirohide Shimono, Tokyo (JP); Naoki Sato, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 241 days.

(21) Appl. No.: 12/998,188

(22) PCT Filed: Jul. 14, 2010

(86) PCT No.: PCT/JP2010/061896
§ 371 (c)(1),
(2), (4) Date: Mar. 25, 2011

(87) PCT Pub. No.: WO2011/010586
PCT Pub. Date: Jan. 27, 2011

(65) Prior Publication Data
US 2011/0178895 A1  Jul. 21, 2011

(30) Foreign Application Priority Data
Jul. 23, 2009  (JP) .................................. 2009-172319

(51) Int. Cl.
*G06Q 30/00* (2012.01)
(52) U.S. Cl.
USPC ............ 705/26.81; 705/27.1; 705/28; 705/29
(58) Field of Classification Search
USPC ............................................. 705/26, 27, 28
See application file for complete search history.

(56) References Cited

U.S. PATENT DOCUMENTS

| 2002/0035495 | A1* | 3/2002 | Spira et al. ........................ 705/7 |
| 2002/0130784 | A1* | 9/2002 | Suzuki et al. ................. 340/635 |
| 2002/0173885 | A1* | 11/2002 | Lowrey et al. .................. 701/29 |

(Continued)

FOREIGN PATENT DOCUMENTS

| EP | 0633536 | 1/1995 |
| JP | 7-093018 | 4/1995 |

(Continued)

OTHER PUBLICATIONS

Naitove, Matthew: "Maintenance software tailored for injection molders," Plastics Technology, Feb. 1994, v40n2p. 15; Dialog file 148 #07200792 3pgs.*

(Continued)

*Primary Examiner* — Rob Pond
(74) *Attorney, Agent, or Firm* — Kenyon & Kenyon LLP

(57) ABSTRACT

A shopping register creating part (111) creates shopping information including a purchase planned quantity of materials by each term based on an inventory standard master (110) in which inventory standard information at least including a lower limit amount of the material in the inventory is set and a maintenance calendar including a planned date of a maintenance work. A material order management part (112) accepts an order of a desired material from the shopping information in accordance with an operation of a user, then inputs a purchase result of the desired material. An inventory management purchase actual performance management part (113) updates an inventory management table managing a material quantity in the inventory based on the purchase result. An equipment master updating part (101) updates the inventory standard master (110) based on an updated result of the inventory management table.

4 Claims, 15 Drawing Sheets

(56) References Cited

U.S. PATENT DOCUMENTS

2003/0105775 A1    6/2003  Shimada
2004/0254764 A1*  12/2004  Wetzer et al. ................ 702/184
2009/0043629 A1*   2/2009  Price ................................ 705/8

FOREIGN PATENT DOCUMENTS

| | | |
|---|---|---|
| JP | 2001-092520 | 4/2001 |
| JP | 2003-167999 | 6/2003 |
| JP | 2003-344122 | 12/2003 |
| JP | 2006-099344 | 4/2006 |
| JP | 2006-244006 | 9/2006 |
| JP | 2008-033908 | 2/2008 |
| JP | 2008-171026 | 7/2008 |

OTHER PUBLICATIONS

Ogando, Joseph: "Automate maintenance or auxilliaries," Plastics Technology, Jun. 1995 v41n6p. 17; Dialog file 148 #07948339 2pgs.*

International Preliminary Report on Patentability dated Feb. 16, 2012, issued in corresponding PCT Application No. PCT/JP2010/061896.

English translation of the Written Opinion of the International Searching Authority, dated Aug. 17, 2010, issued in corresponding PCT Application No. PCT/JP2010/061896.

International Search Report dated Aug. 17, 2010 issued in corresponding PCT Application No. PCT/JP2010/061896.

* cited by examiner

F I G. 3

INSPECTION CALENDAR

| INSPECTION APPARATUS | ←——— TIME AXIS ———→ | | | | | | |
|---|---|---|---|---|---|---|---|
| WELDING MACHINE HYDRAULIC PRESSURE INSPECTION | 1/1 | | | | −/1 | | |
| ELECTRIC CLEATING DRIVING APPARATUS INSPECTION | | | 1/1 | | | −/1 | |
| FRONT SURFACE HYDRAULIC PRESSURE APPARATUS INSPECTION | | (1/1) | | | −/1 | | |
| . . . | | | | | | | |
| | | | | | | | |

ACTUAL PERFORMANCE/PLAN

FIG. 6

| COMPONENT NAME | MODEL NUMBER | MAKER | ... |
|---|---|---|---|
| HYDRAULIC PUMP | PVQ | BB | |
| CHAIN COUPLING | CR10000 | CC | |

FIG. 7

| MAY 2006 | 1 | 2 | 3 | 4 | 5 | 6 | 7 | ... |
|---|---|---|---|---|---|---|---|---|
| PUMP REPLACEMENT | | ▨ | | | | | | |
| COUPLING INSPECTION LUBRICATION | | ▨ | | | | | | |
| PUMP COUPLING INSPECTION | | ▨ | | | | | | |

F I G. 8

CONSTRUCTION DRAFT INFORMATION

| CONSTRUCTION NAME : NO.1 PUMP REPAIR                 ||||
|---|---|---|---|
| WORK PLANNED DATE : 2006/5/2 TO 2006/5/2             ||||
| NO. | MAINTENANCE CONTENTS | MAN-HOUR | MATERIAL |
| 1 | PUMP REPLACEMENT | 1.00 | EXIST |
| 2 | COUPLING INSPECTION LUBRICATION | 0.50 | EXIST |
| 3 | PUMP COUPLING INSPECTION | 0.50 | |
| TOTAL MAN-HOUR || 2.00 | |

F I G. 9

SHOPPING REGISTER

| | MATERIAL NO. | NAME OF PRODUCT | MODEL NUMBER | MATERIAL CHARACTERS | INVENTORY QUANTITY | MINIMUM INVENTORY | FINAL INVENTORY ESTIMATED AMOUNT |
|---|---|---|---|---|---|---|---|
| ☐ | A111 | aaaaa | | | 20 | 10 | |
| ☑ | A112 | bbbbb | | | | | |
| ☐ | A113 | ccccc | | | 200 | | |

| UNIT PRICE | STANDARD DELIVERY DATE | PURCHASE IN THIS TERM | | H19 | | H20 | | H21 | |
| | | PLAN | ACTUAL PERFORMANCE | LATTER HALF | FIRST HALF | LATTER HALF | FIRST HALF | LATTER HALF | |
| 100 | 10 DAYS | 100 | 30 | 30 | 30 | 30 | 30 | 30 | |
| 150 | 2 MONTHS | 50 | | 50 | 20 | 10 | 30 | | |
| 800 | 4 MONTHS | 500 | 250 | | | 250 | | 250 | |

F I G. 10

| | -6 TERM | -5 TERM | -4 TERM | -3 TERM | -2 TERM | -1 TERM | THIS TERM | +1 TERM | +2 TERM | +3 TERM | +4 TERM | +5 TERM | +6 TERM |
|---|---|---|---|---|---|---|---|---|---|---|---|---|---|
| STOCK INVENTORY AMOUNT | 3 | 3 | 3 | 3 | 3 | 3 | 5 | | | | | | |
| SITE INVENTORY AMOUNT | 2 | 2 | 2 | 2 | 3 | 2 | 3 | | | | | | |
| INVENTORY AMOUNT | 5 | 5 | 5 | 5 | 6 | 5 | 8 | | | | | | |
| ORDER ON REQUEST | - | - | - | - | - | - | 3 | | | | | | |
| PLANNED ORDER | - | - | - | - | - | - | 50 | 30 | 20 | 20 | 30 | | |
| USAGE ACTUAL PERFORMANCE/ESTIMATED USAGE | 3 | 3 | 3 | 3 | 3 | 4 | 20 | | | 20 | 20 | 30 | |
| HELD INVENTORY AMOUNT ESTIMATION | 2 | 2 | 2 | 2 | 3 | 1 | 38 | | | | | | |

F I G. 13
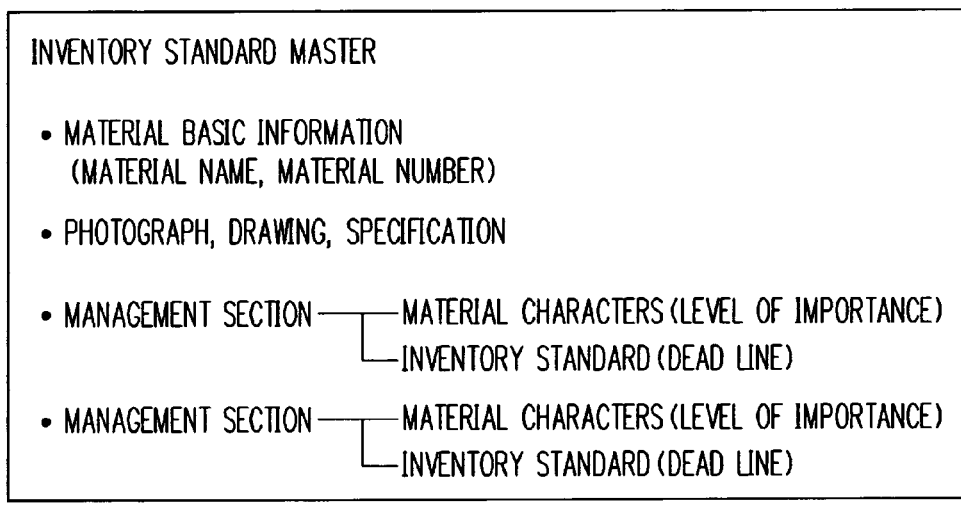

F I G. 16
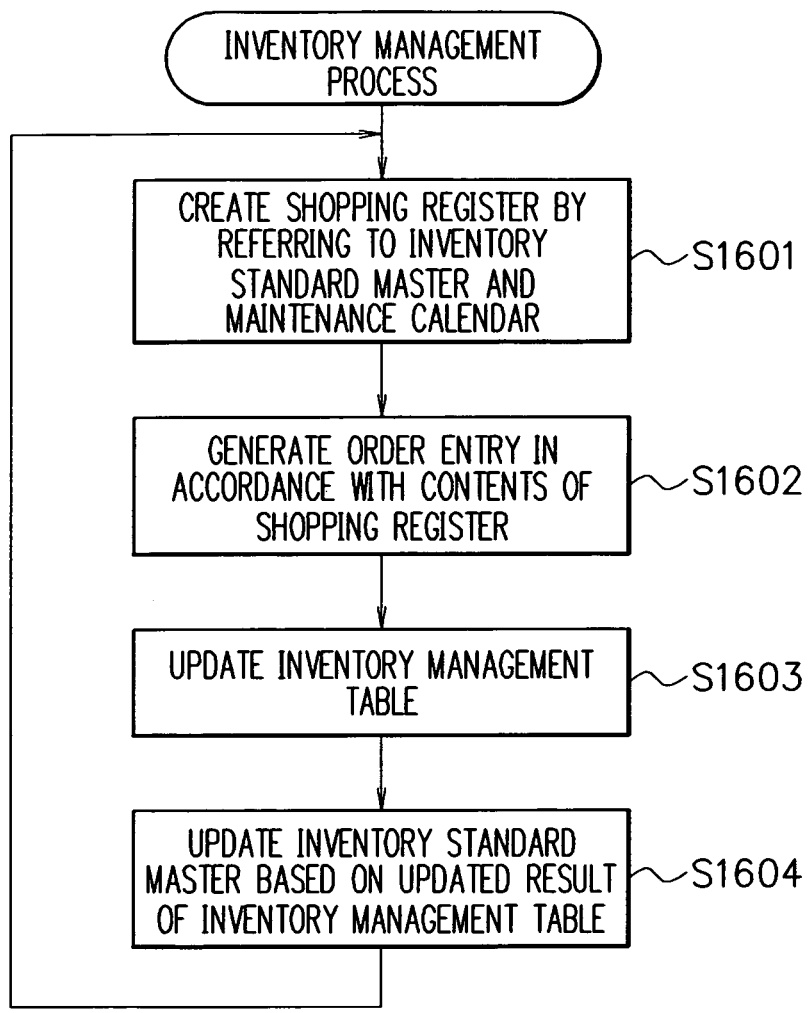

F I G. 17
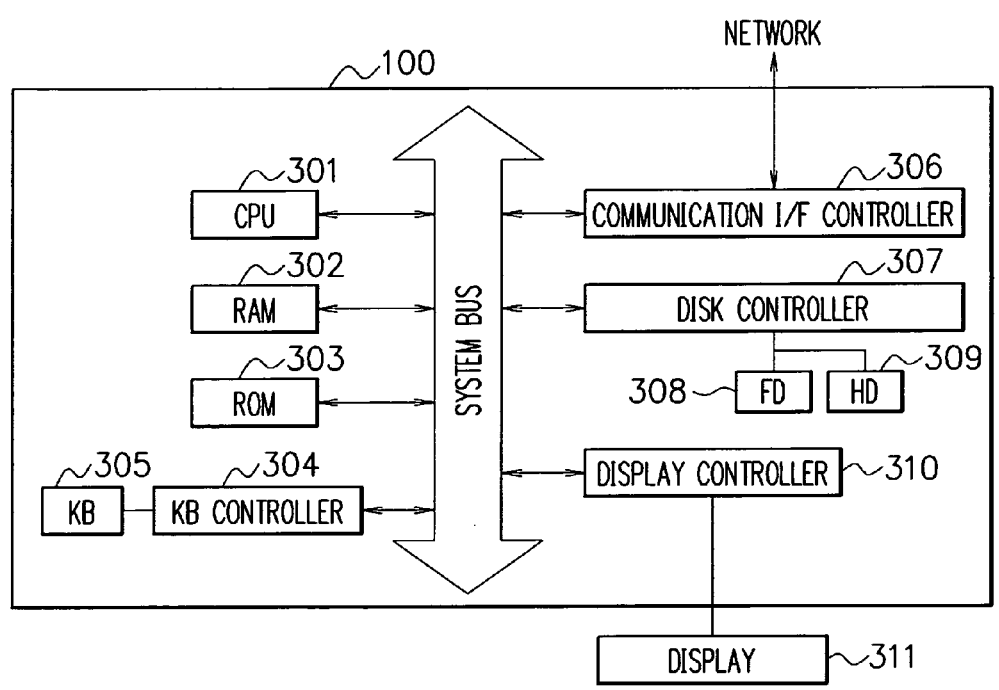

EQUIPMENT MANAGEMENT SYSTEM, EQUIPMENT MANAGEMENT METHOD AND PROGRAM

This application is a national stage application of International Application No. PCT/JP2010/061896, filed 14 Jul. 2010, which claims priority to Japanese Application No. 2009-172319, filed 23 Jul. 2009, which is incorporated by reference in its entirety.

TECHNICAL FIELD

The present invention relates to an art to manage an inspection work, a maintenance work, and so on of equipment.

BACKGROUND ART

In a conventional schedule maintenance of equipment, respective business steps such as management of a maintenance standard, management of a maintenance schedule, management of a maintenance work performance, management of a maintenance history have been performed based on perceptions and experiences of experts, and thereby, the schedule maintenance has been established. In recent years, an approach in which the respective business steps are individually assigned to computers to effectively operate the maintenance schedule has also been made.

There is an art disclosed in Patent Document 1 as an example using a computer system for the maintenance work. In this conventional example, information relating to performance of a maintenance work of a plant inputted from a terminal is consolidated to a maintenance history database.

CITATION LIST

Patent Literature

Patent Document 1: Japanese Laid-open Patent Publication No. 2003-167999
Patent Document 2: Japanese Laid-open Patent Publication No. 2008-33908
Patent Document 3: Japanese Laid-open Patent Publication No. 2006-244006

SUMMARY OF THE INVENTION

Technical Problem

However, there is a possibility in which an oversight of data occurs when the number of equipment and so on being maintenance objects is very large. There is a possibility in which defectiveness occurs in transfer of data when a calculation result of one computer is used by another computer, because respective computers are independent from one another in the conventional art in which respective business steps are assigned to the computers.

An object of the present invention is to avoid the possibility in which defectiveness occurs in the transfer of data by connecting input/output of calculation results of the computer in the respective business steps, and to constantly maintain a master including standard information for maintenance and inventory in an optimum state.

Solution To Problem

An equipment management system according to the present invention includes: a maintenance calendar creating unit creating a maintenance calendar indicating a plan of a maintenance work based on a maintenance standard master in which maintenance standard information at least including a maintenance cycle is set; a maintenance performance management unit prompting the maintenance work at a planned time of the maintenance work set at the maintenance calendar; a first analysis unit inputting a result of the maintenance work and analyzing a maintenance actual performance based on the inputted result of the maintenance work; an updating unit updating the maintenance standard master based on an analysis result by the first analysis unit; a shopping information creating unit creating shopping information including a purchase planned quantity of materials by each term based on an inventory standard master setting inventory standard information at least including a lower limit amount of the material in the inventory is set and the maintenance calendar including a planned date of the maintenance work; an accepting unit accepting an order of a desired material from the shopping information in accordance with an operation of a user; a purchase result input unit inputting a purchase result of the desired material; an inventory management table updating unit updating an inventory management table managing a material quantity in the inventory based on the purchase result; and an inventory standard master updating unit updating the inventory standard master based on an updated result of the inventory management table.

An equipment management method of the present invention achieved by an equipment management system, wherein the equipment management system includes: a maintenance calendar creating step of creating a maintenance calendar indicating a plan of a maintenance work based on a maintenance standard master in which maintenance standard information at least including a maintenance cycle is set; a maintenance performance management step of prompting the maintenance work at a planned time of the maintenance work set at the maintenance calendar; an analyzing step of inputting a result of the maintenance work and analyzing a maintenance actual performance based on the inputted result of the maintenance work; an updating step of updating the maintenance standard master based on the analysis result by the analysis step; a shopping information creating step of creating shopping information including a purchase planned quantity of materials by each term based on an inventory standard master in which inventory standard information at least including a lower limit amount of the material in the inventory is set and the maintenance calendar including a planned date of the maintenance work; an accepting step of accepting an order of a desired material from the shopping information in accordance with an operation of a user; a purchase result input step of inputting a purchase result of the desired material; an inventory management table updating step of updating an inventory management table managing a material quantity in the inventory based on the purchase result; and an inventory standard master updating step of updating the inventory standard master based on an updated result of the inventory management table.

A program product of the present invention for causing a computer to execute: a maintenance calendar creating step of creating a maintenance calendar indicating a plan of a maintenance work based on a maintenance standard master in which maintenance standard information at least including a maintenance cycle is set; a maintenance performance management step of prompting the maintenance work at a planned time of the maintenance work set at the maintenance calendar; an analysis step of inputting a result of the maintenance work and analyzing a maintenance actual performance based on the inputted result of the maintenance work; an updating step of updating the maintenance standard master based on the analysis result by the analysis step; a shopping information creating step of creating shopping information including a purchase planned quantity of materials by each term based on an inventory standard master in which inventory standard information at least including a lower limit amount of the material in the inventory is set and the maintenance calendar including a planned date of the maintenance work; an accepting step of accepting an order of a desired material from the shopping information in accordance with an operation of a user; a purchase result input step of inputting a purchase result of the desired material; an inventory management table updating step of updating an inventory management table managing a material quantity in the inventory based on the purchase result; and an inventory standard master updating step of updating the inventory standard master based on an updated result of the inventory management table.

Advantageous Effects Of Invention

In the present invention, it is possible to avoid a possibility in which defectiveness occurs in a transfer of data by connecting input/output of calculation results of a computer at respective business steps, and to constantly maintain a master including standard information for maintenance and inventory in an optimum state.

BRIEF DESCRIPTION OF DRAWINGS

FIG. 3 is a view illustrating an example of an inspection calendar created by an inspection calendar creating part;

FIG. 6 is a view illustrating a screen displaying detailed information of required materials;

FIG. 7 is a view illustrating an example of a screen displayed when a "monthly schedule" button in FIG. 5B is pressed;

FIG. 8 is a view illustrating an example of construction draft information;

FIG. 9 is a view illustrating an example of a shopping register;

FIG. 10 is a view illustrating a configuration example of an inventory management table;

FIG. 13 is a view illustrating a configuration example of an inventory standard master;

FIG. 16 is a flowchart illustrating a flow of a process of the equipment total management system for a business division of a "material management"; and FIG. 17 is a view illustrating a hardware configuration of the equipment total management system according to the present invention.

DESCRIPTION OF EMBODIMENTS

Hereinafter, preferred embodiments applying the present invention are described in detail with reference to the attached drawings.

Figure 1:
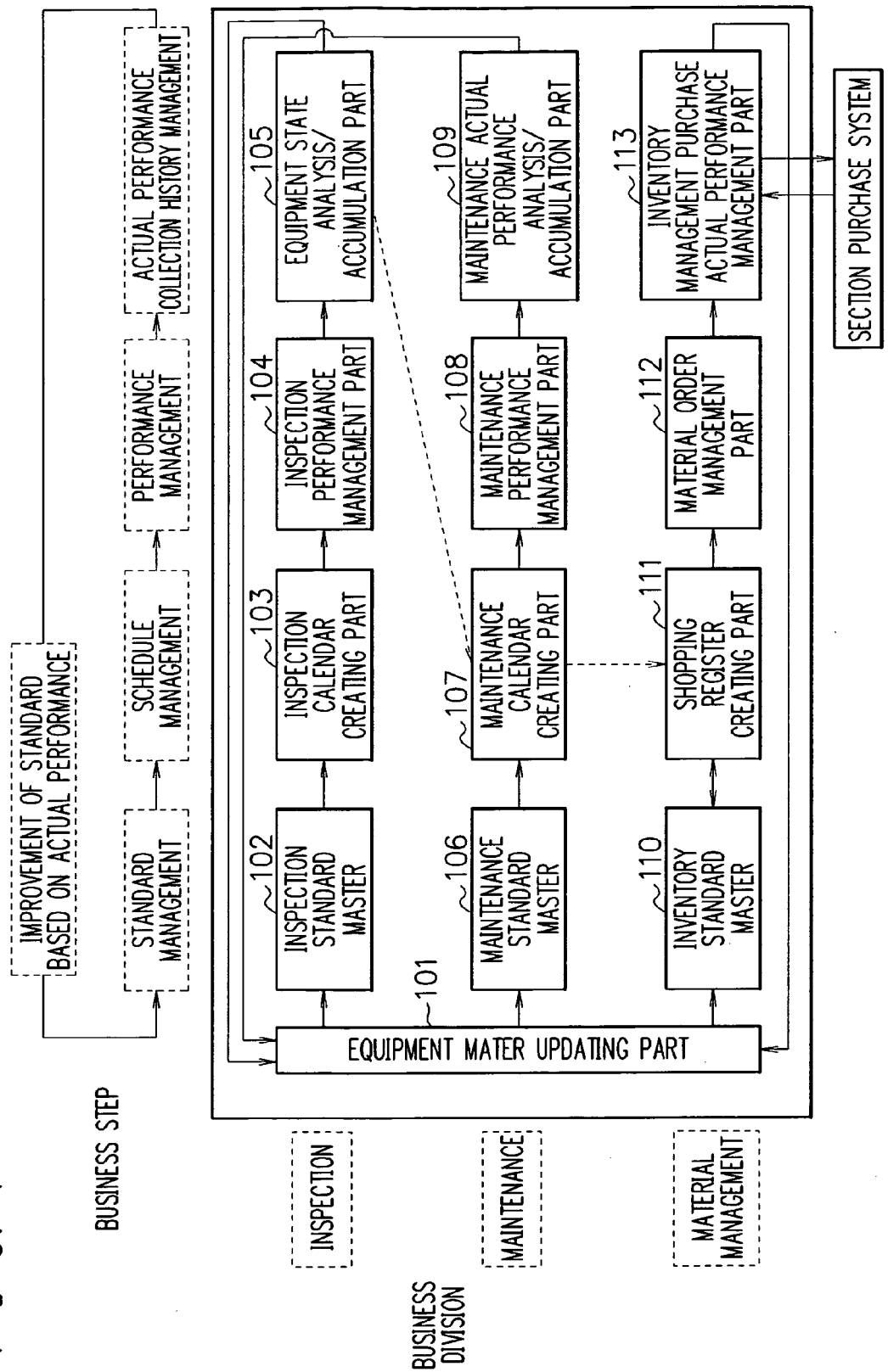
FIG. 1 is a view illustrating a functional configuration of an equipment total management system according to the present invention.

FIG. 1 is a view illustrating a functional configuration of an equipment total management system according to an embodiment of the present invention. The equipment total management system illustrated in FIG. 1 includes an equipment master updating part 101, an inspection standard master 102, an inspection calendar creating part 103, an inspection performance management part 104, an equipment state analysis/accumulation part 105, a maintenance standard master 106, a maintenance calendar creating part 107, a maintenance performance management part 108, a maintenance actual performance analysis/accumulation part 109, an inventory standard master 110, a shopping register creating part 111, a material order management part 112, and an inventory management purchase actual performance management part 113.

Business steps are performed in circulation in an order of a "standard management", a "schedule management", a "performance management", an "actual performance collection history management", an "improvement of standard based on actual performance", and the "standard management" by the configuration as stated above. The business step of the "standard management" is performed by the inspection standard master 102, the maintenance standard master 106, and the inventory standard master 110. The business step of the "schedule management" is performed by the inspection calendar creating part 103, the maintenance calendar creating part 107, and the shopping register creating part 111. The business step of the "performance management" is performed by the inspection performance management part 104, the maintenance performance management part 108, and the material order management part 112. The business step of the "actual performance collection history management" is performed by the equipment state analysis/accumulation part 105, the maintenance actual performance analysis/accumulation part 109, and the inventory management purchase actual performance management part 113. The business step of the "improvement of standard based on actual performance" is performed by the equipment master updating part 101.

Besides, in the present embodiment, business divisions of an "inspection", a "maintenance", and a "material management" are assumed. Namely, the above-stated respective business steps ("standard management", "schedule management", "performance management", "actual performance collection history management", "improvement of standard based on actual performance") are performed by each of the business divisions of the "inspection", the "maintenance", and the "material management".

The equipment master updating part 101, the inspection standard master 102, the inspection calendar creating part 103, the inspection performance management part 104, and the equipment state analysis/accumulation part 105 are assigned to the business division of the "inspection". The equipment master updating part 101, the maintenance standard master 106, the maintenance calendar creating part 107, the maintenance performance management part 108, and the maintenance actual performance analysis/accumulation part 109 are assigned to the business division of the "maintenance". The equipment master updating part 101, the inventory standard master 110, the shopping register creating part 111, the material order management part 112, and the inventory management purchase actual performance management part 113 are assigned to the business division of the "material management".

Namely, the business step of the "standard management" is achieved by the inspection standard master 102 in the business division of the "inspection". The business step of the "schedule management" is achieved by the inspection calendar creating part 103 in the business division of the "inspection". The business step of the "performance management" is achieved by the inspection performance management part 104 in the business division of the "inspection". The business step of the "actual performance collection history management" is achieved by the equipment state analysis/accumulation part 105 in the business division of the "inspection". Besides, the business step of the "improvement of standard based on actual performance" is achieved by the equipment master updating part 101 in the business division of the "inspection".

The business step of the "standard management" is achieved by the maintenance standard master 106 in the business division of the "maintenance". The business step of the "schedule management" is achieved by the maintenance calendar creating part 107 in the business division of the "maintenance". The business step of the "performance management" is achieved by the maintenance performance management part 108 in the business division of the "maintenance". The business step of the "actual performance collection history management" is achieved by the maintenance actual performance analysis/accumulation part 109 in the business division of the "maintenance". Besides, the business step of the "improvement of standard based on actual performance" is achieved by the equipment master updating part 101 in the business division of the "maintenance".

The business step of the "standard management" is achieved by the inventory standard master 110 in the business division of the "material management". The business step of the "schedule management" is achieved by the shopping register creating part 111 in the business division of the "material management". The business step of the "performance management" is achieved by the material order management part 112 in the business division of the "material management". The business step of the "actual performance collection history management" is achieved by the inventory management purchase actual performance management part 113 in the business division of the "material management". Besides, the business step of the "improvement of standard based on actual performance" is achieved by the equipment master updating part 101 in the business division of the "material management".

Figure 2:
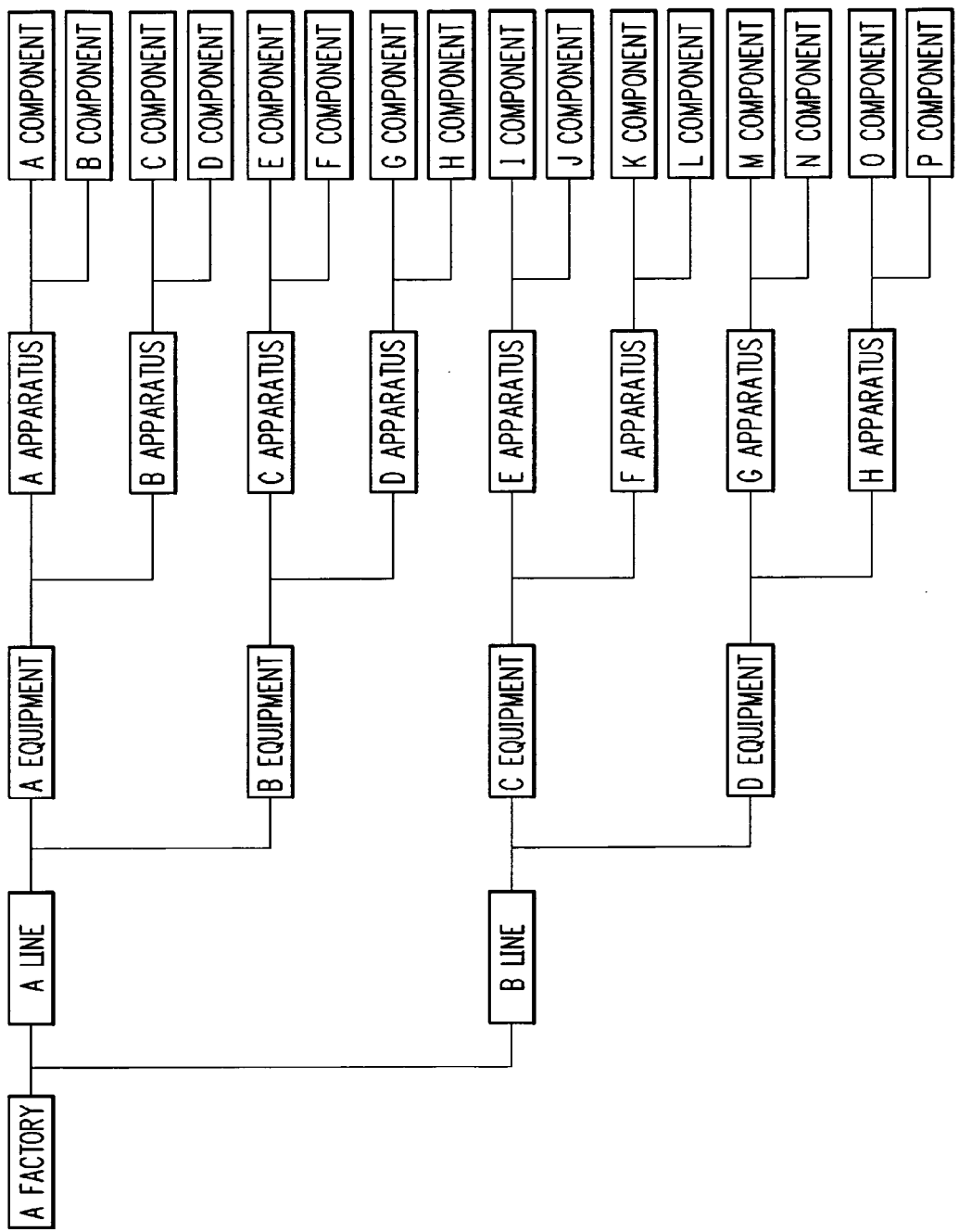
FIG. 2 is a view to explain a hierarchical management system of an inspection standard, a maintenance standard.

Note that the inspection standard and the maintenance standard are managed by a hierarchy system of factories, lines, equipments, apparatuses, components in the present embodiment as illustrated in FIG. 2. For example, it is illustrated in FIG. 2 that there are an A line and a B line in an A factory. This means that there are the inspection standard master 102 for the A line and the inspection standard master 102 for the B line while being associated with each other in the inspection standard master 102 for the A factory. Between the hierarchies under the lines are associated between the inspection standard masters. It is also the same as for the maintenance standard master 106.

FIG. 17 is a view illustrating a hardware configuration of the equipment total management system according to the present embodiment. A CPU 301 totally controls each device and controller connected to a system bus. An BIOS (Basic Input/Output System) being a control program of the CPU 301, an operating system program, programs for processes illustrated in, for example, FIG. 14 to FIG. 16 executed by the equipment total management system, and so on are stored at a ROM 303 or an HD (hard disk) 309.

Note that in the example in FIG. 17, it is constituted such that the HD 309 is disposed inside the equipment total management system, but it may be constituted as another embodiment such that a component corresponding to the HD 309 is disposed at outside of the equipment total management system. Besides, it may be constituted such that the programs to perform the processes illustrated in, for example, FIG. 14 to FIG. 16 according to the present embodiment are recorded at computer readable recording media such as a flexible disk (FD), a CD-ROM, or the like, and they are supplied from the recording media, or via a communication medium such as Internet.

A RAM 302 functions as a main memory, a work area and so on of the CPU 301. The CPU 301 achieves various kinds of operations by loading the programs and so on necessary when the processes are performed on the RAM 302, and by executing the programs.

The HD 309 and an FD 308 function as external memories. The CPU 301 achieves various kinds of operations by loading the programs and so on necessary when the processes are performed on the RAM 302, and by executing the programs.

A disk controller 307 controls accesses to the external memories such as the HD 309, the FD 308. A communication I/F controller 306 is connected to Internet and LAN, and controls communication with external by, for example, TCP/IP.

A display controller 310 controls an image display on a display 311.

A KB controller 304 accepts an operation input from a KB (keyboard) 305, and transmits to the CPU 301. Note that a pointing device such as a mouse can be applied to the equipment total management system as an operation means of a user in addition to the KB 305 though it is not illustrated.

Note that it is constituted such that the equipment master updating part 101, the inspection calendar creating part 103, the inspection performance management part 104, the maintenance calendar creating part 107, the maintenance performance management part 108, the shopping register creating part 111, and the material order management part 112 are stored inside, for example, the HD 309, and achieved by the programs loaded on the RAM 302 as required and the CPU 301 executing the programs.

Besides, the inspection standard master 102, the maintenance standard master 106, the inventory standard master 110 are stored at a partial storage area of the HD 309 or the RAM 302. Besides, it is constituted such that the equipment state analysis/accumulation part 105, the maintenance actual performance analysis/accumulation part 109, the inventory management purchase actual performance management part 113 are stored inside, for example, the HD 309, and achieved by the programs loaded on the RAM 302 as required and the CPU 301 executing the programs, and they correspond to the partial storage area of the HD 309 or the RAM 302.

Next, operations of the equipment total management system according to the present embodiment are described with reference to the configuration chart illustrated in FIG. 1, and flowcharts from FIG. 14 to FIG. 16.

Figure 14:
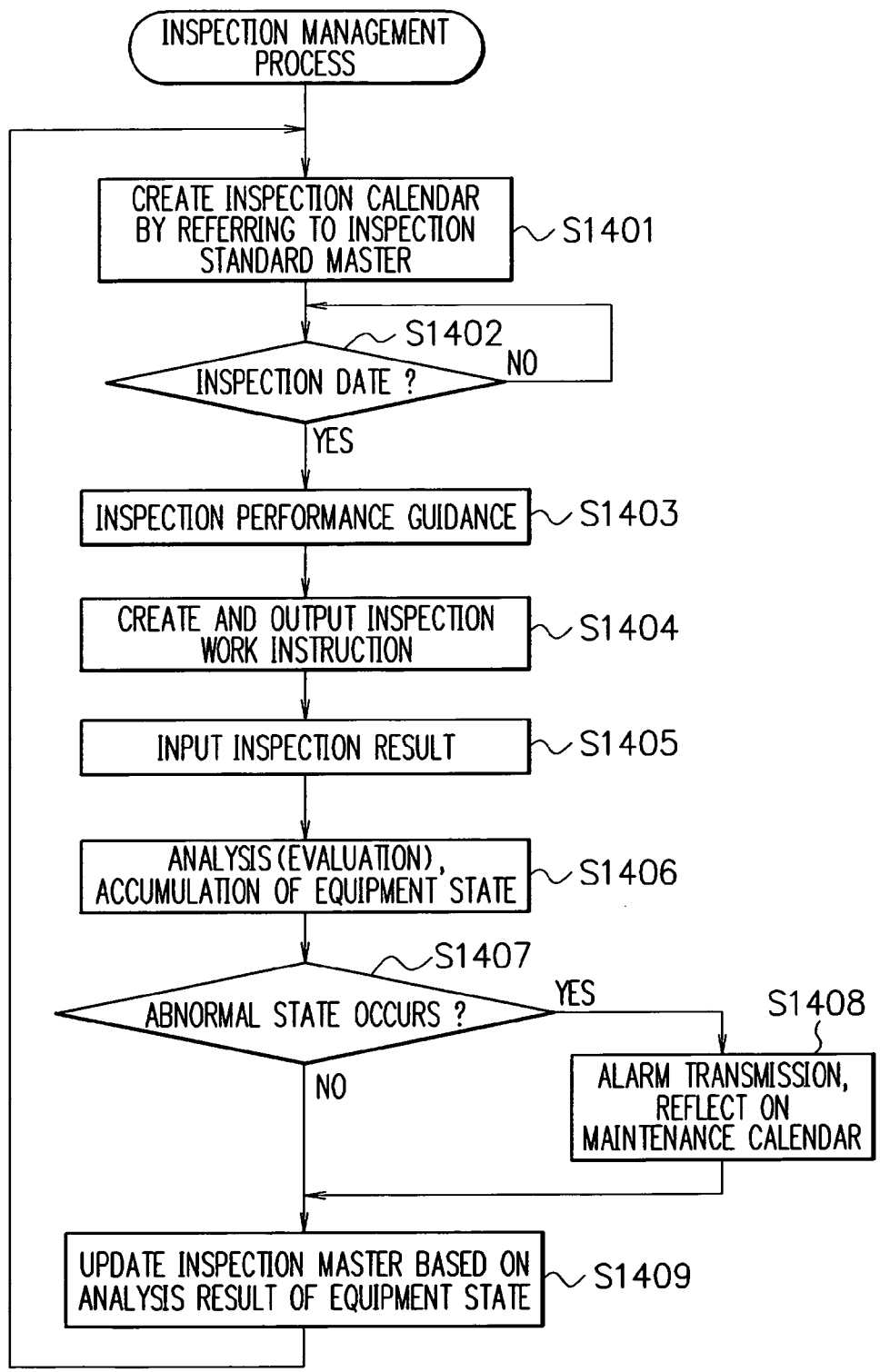
FIG. 14 is a flowchart illustrating a flow of a process of the equipment total management system for a business division of an "inspection"

FIG. 14 illustrates a flow of the process of the equipment total management system for the business division of the "inspection". In FIG. 14, the inspection calendar creating part 103 creates an inspection calendar by referring to the inspection standard master 102 (step S1401).

Figure 11:
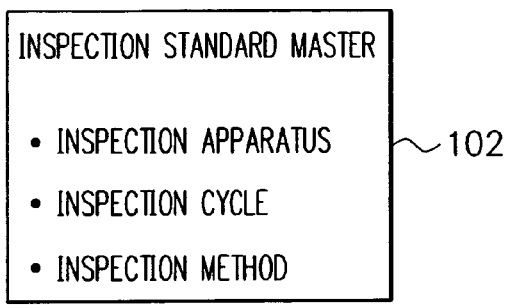
FIG. 11 is a view illustrating a configuration example of an inspection standard master.

FIG. 11 is a view illustrating a configuration example of the inspection standard master 102. As illustrated in FIG. 11, information such as an inspection apparatus, an inspection cycle, an inspection method is held in the inspection standard master 102. Namely, the inspection calendar creating part 103 refers to the inspection cycle inside the inspection standard master 102, and creates the inspection calendar indicating an inspection date by each inspection apparatus. For example, the inspection calendar with flags indicating that the inspection is to be performed by every one week from a standard date (first inspection date) is created when the inspection cycle of an apparatus A is one week.

FIG. 3 is a view illustrating an example of the inspection calendar created by the inspection calendar creating part 103. In the example in FIG. 3, there are a "welding machine hydraulic pressure inspection", an "electric cleaning driving apparatus inspection", and a "front surface hydraulic pressure apparatus inspection", as inspection apparatuses, and flags of "/1" are added to the dates (inspection planned dates) when these apparatuses are to be inspected. In FIG. 3, concrete inspection planned dates are not indicated, but the inspection planned dates are defined in the inspection cycle determined by each inspection apparatus. Note that there are flags of "1/1" and "−/1" in FIG. 3, in which an "actual performance/plan" is represented by the flag. The "1/1" represents that the inspection is already performed at the corresponding inspection planned date, and the "−/1" represents that the inspection is not performed yet at the corresponding inspection planned date.

Subsequently, the inspection performance management part 104 refers to the inspection calendar, and judges whether or not today is the inspection planned date (step S1402). When today is not the inspection planned date, the judgment of the step S1402 is repeated until it is the inspection planned date. On the other hand, when today is the inspection planned date, the inspection performance management part 104 notifies maintenance workers that today is the inspection planned date (step S1403). There is no limitation in notification modes of this notification method, and a mail notifying the inspection planned date may be sent to a corresponding maintenance worker, or a screen notifying the inspection planned date may be displayed on a display.

Next, the inspection performance management part 104 creates and outputs an inspection work instruction data, (step S1404). This inspection work instruction data is created by referring to the inspection standard master 102, and includes what is an inspection apparatus, how to perform the inspection (inspection method), matters to be attended to at the inspection time, and so on. The created inspection work instruction data is notified to the maintenance worker by means of an action guidance. The maintenance worker performs the inspection work in accordance with contents of the inspection work instruction data.

Subsequently, a result of the inspection work is inputted by an inspection worker (step S1405). Operation states of the apparatus (vibration, temperature, operation speed, and so on of the apparatus), presence/absence of a sign of occurrence of abnormal state, and so on are inputted as the result of the inspection work.

Next, the equipment state analysis/accumulation part 105 analyses a state of the inspection apparatus from the inputted result of the inspection work, and accumulates the inspection result (step S1406). As a concrete example of an analysis method of the inspection apparatus state, it is judged that an abnormal state occurs when the inspection apparatus does not operate at all, or it is judged that there is a possibility that the abnormal state occurs when the temperature of the inspection apparatus is high and when the operation speed is slow.

Figure 4:
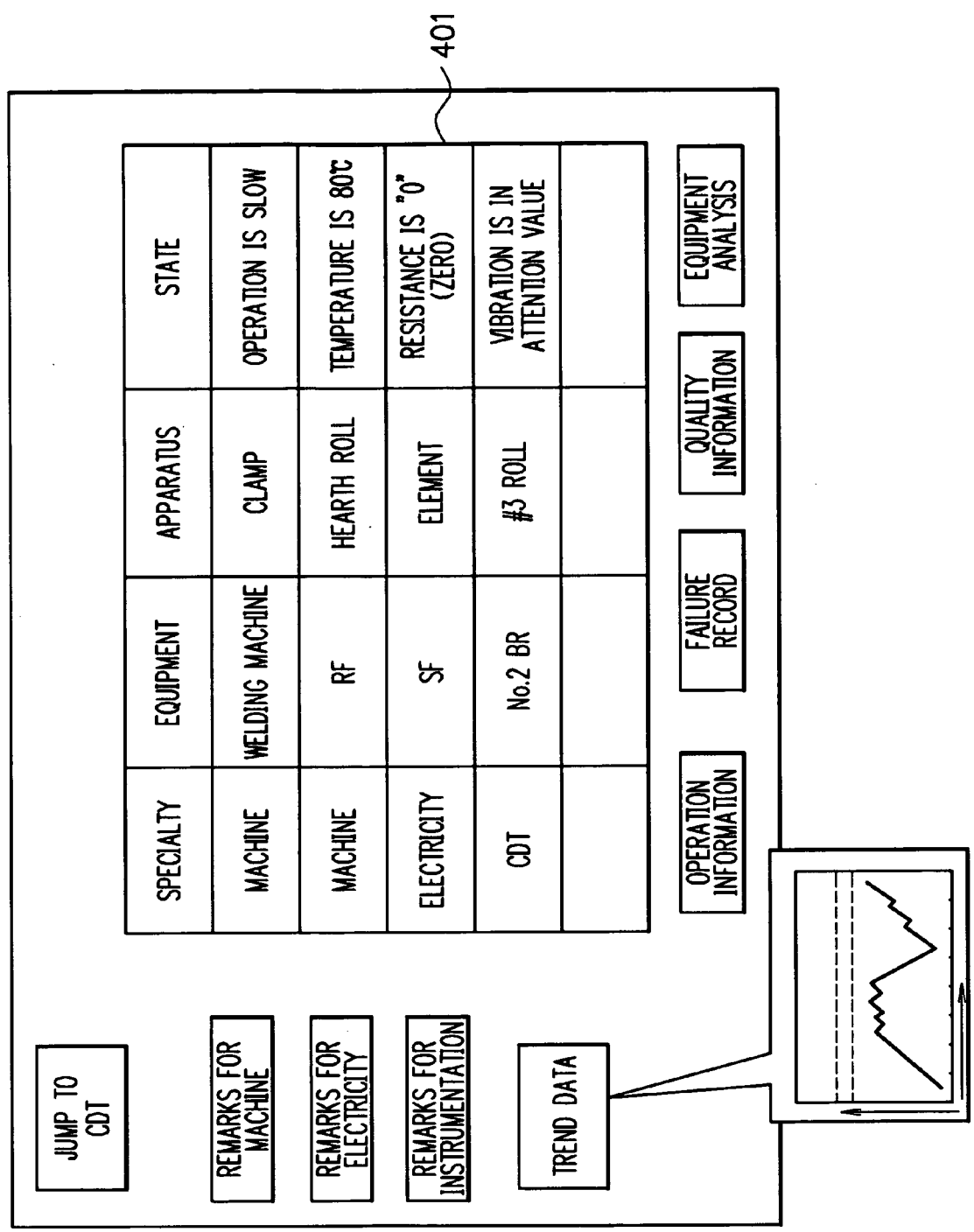
FIG. 4 is a view illustrating an example of an inspection result reference screen.

The inspection results accumulated by the equipment state analysis/accumulation part 105 can be referred to on the screen. FIG. 4 is a view illustrating an example of an inspection result reference screen. A field of the inspection apparatus is represented in a "specialty", an equipment where the inspection apparatus is disposed is represented in an "equipment", an inspection apparatus is represented in an "apparatus", and an inspection result is represented in a "state" at an inspection result display area 401.

When a "JUMP to CDT" button is pressed, the screen is switched to a screen referring to state information sequentially obtained by a system named an online CDT from the inspection apparatus. The online CDT obtains the detailed state information from the inspection apparatus, and therefore, the user presses the "JUMP to CDT" button when the more detailed information is to be referred to.

An inspection result list of the inspection apparatus belonging to a corresponding field among a machine, an electricity, or an instrumentation can be displayed at the inspection result display area 401 by pressing a "remarks for machine" button, a "remarks for electricity" button, or a "remarks for instrumentation" button.

Transition of recent inspection results can be displayed in a graphic chart by pressing a "trend data" button. A transition of the inspection results of which apparatus is to be displayed can be selected from, for example, the apparatuses displayed at the inspection result display area 401.

New information relating to operations such that, for example, a product with a certain tonnage is added to an apparatus is displayed by pressing an "operation information" button. A history relating to failure of the apparatus is displayed by a "failure record" button. A relationship between the apparatus and quality is displayed by a "quality information" button. A result of the analysis process at the step S1406 is displayed by an "equipment analysis" button. The analysis process is performed based on analysis results up to that time, and therefore, reliability becomes higher as the number of inspection times in the past is large. Accordingly, the reliability of the analysis process displayed here corresponds to, for example, the number of analysis processes in the past.

Next, the equipment state analysis/accumulation part 105 judges whether or not an abnormal state occurs from the analysis result of the inspection apparatus state (step S1407). When the abnormal state occurs, the equipment state analysis/accumulation part 105 transmits an alarm and sets a maintenance planned date at a maintenance calendar (step S1408). After that, the process transfers to step S1409. On the other hand, when the abnormal state does not occur, the process transfers to the step S1409 without executing the step S1408. Note that it may also be judged at the step S1407 whether or not there is a possibility that the abnormal state occurs. When there is the possibility that the abnormal state occurs (when the abnormal state does not occur yet), the equipment state analysis/accumulation part 105 transmits the alarm. After that, the process transfers to the step S1409. On the other hand, when there is not the possibility that the abnormal state occurs, the process transfers to the step S1409 as it is.

Next, the equipment master updating part 101 updates the inspection standard master 102 based on the analysis result by the equipment state analysis/accumulation part 105 (step S1409). Specifically, for example, when the analysis result is that "the abnormal state occurs", the inspection cycle can be updated to a shorter cycle because the occurrence of the abnormal state cannot be prevented by the inspection cycle up to that time, or the inspection method can be updated to another inspection method because the inspection method is not adequate. Similarly, when the analysis result is that "there is the possibility that the abnormal state occurs", the inspection cycle can be updated to the shorter cycle to more enhance the alert, or the inspection method can be switched to the one in a direction to enhance the alert.

Figure 15:
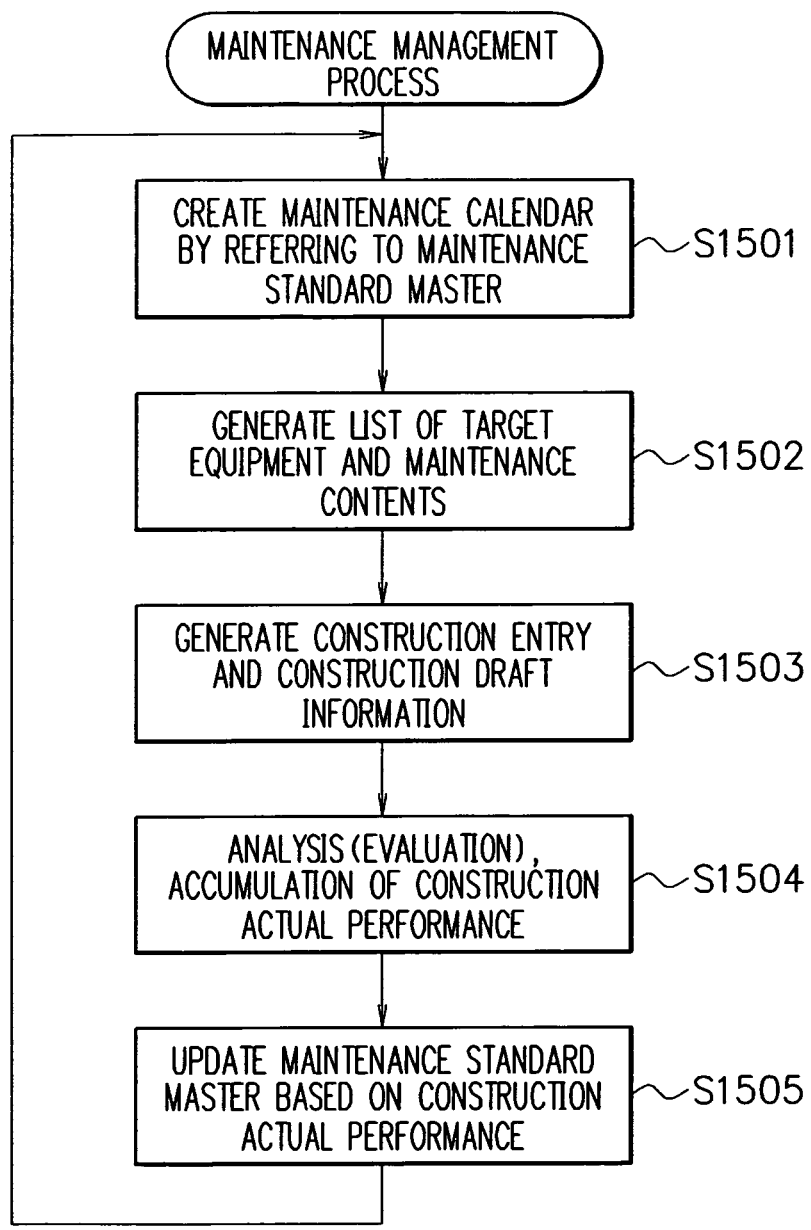
FIG. 15 is a flowchart illustrating a flow of a process of the equipment total management system for a business division of a "maintenance"

FIG. 15 illustrates a flow of the process of the equipment total management system for the business division of the "maintenance". In FIG. 15, the maintenance calendar creating part 107 creates the maintenance calendar by referring to the maintenance standard master 106 (step S1501).

Figure 12:
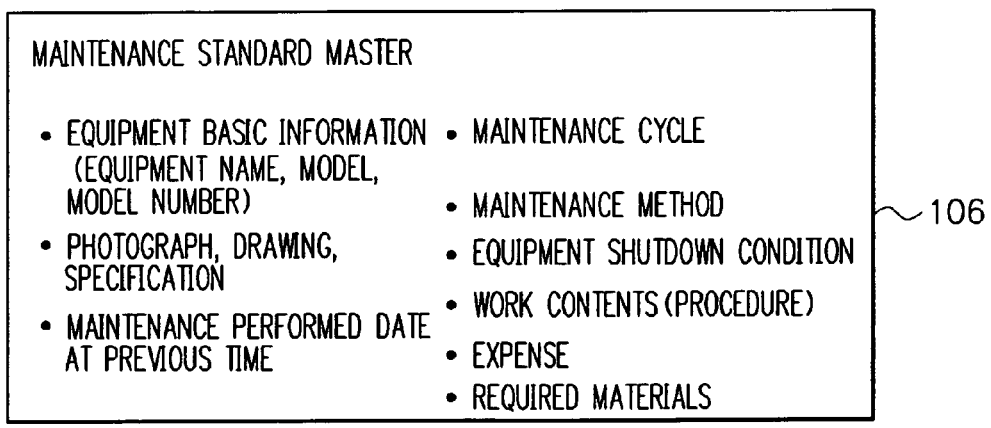
FIG. 12 is a view illustrating a configuration example of a maintenance standard master.

FIG. 12 is a view illustrating a configuration example of the maintenance standard master 106. As illustrated in FIG. 12, equipment basic information (equipment name, model, model number), a maintenance cycle, a maintenance method, an equipment shutdown condition, work contents, expense, required materials, a photograph of a target equipment, drawings and specifications, and a maintenance performed date at the previous time, and so on are held in the maintenance standard master 106. The maintenance cycle is the maintenance cycle for the equipment indicated by the equipment basic information. The equipment shutdown condition indicates a case when the equipment is to be shutdown when a result of the maintenance work is in what state. The work contents indicate a work procedure when the maintenance is performed. The expense is expense information required for the maintenance, and the required materials are the required materials necessary for the maintenance.

The maintenance calendar creating part 107 refers to the maintenance cycle in the maintenance standard master 106, and creates the maintenance calendar indicating the maintenance date by each component. For example, when the maintenance cycle of a component A is one month, the maintenance calendar with flags indicating that the maintenance is to be performed by every one month from a standard date (a first maintenance date or the previous performance date) is created. Besides, the maintenance method, the maintenance contents of the target component are also set in the maintenance calendar.

Figures 5A, 5B, 5C:
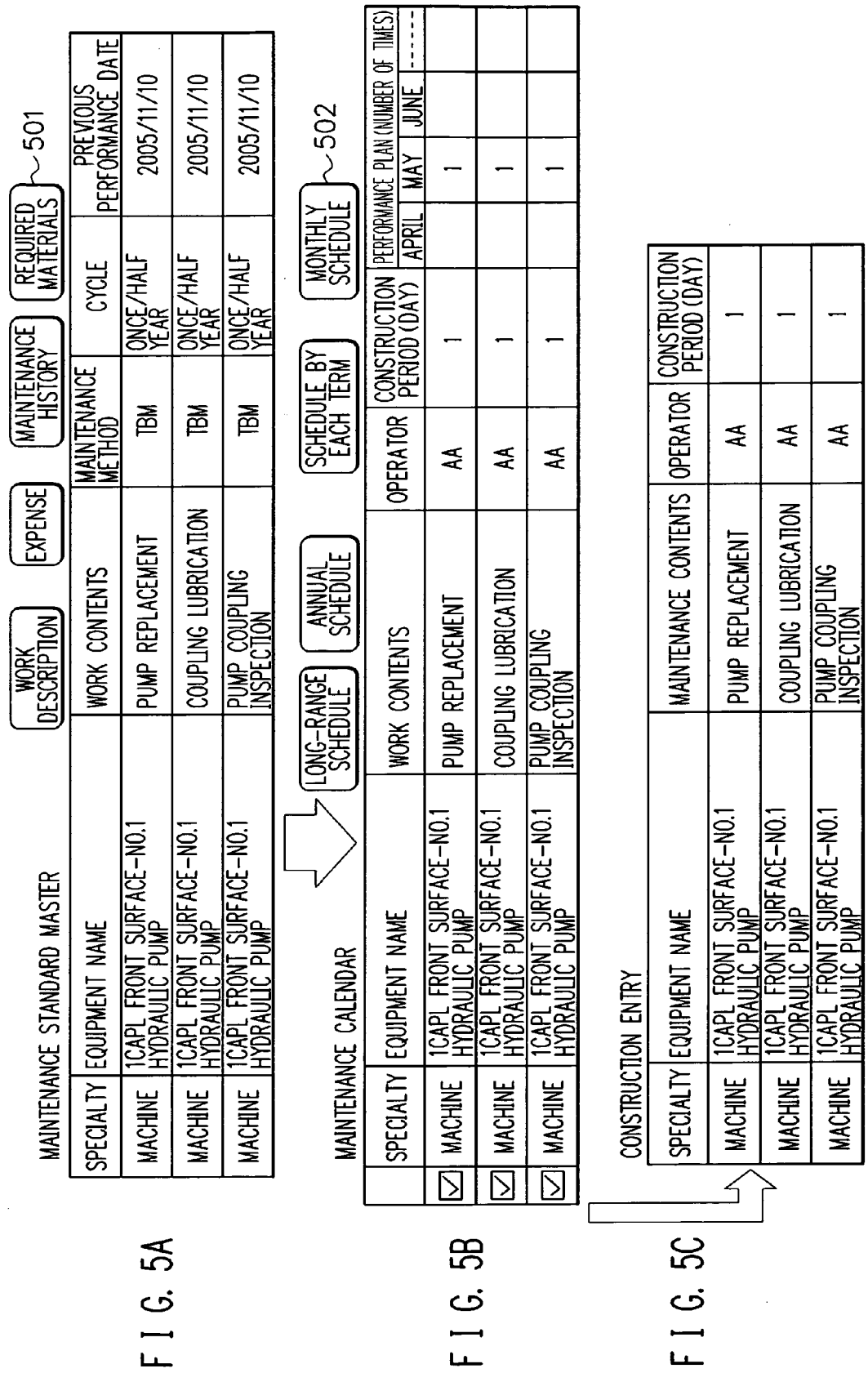
FIGS. 5A to 5C are views to explain processes from a generation of a maintenance calendar from a maintenance standard master to a generation of a construction entry from the maintenance calendar.

FIGS. 5A to 5C are views to explain the processes from the generation of the maintenance calendar from the maintenance standard master 106 to a generation of a construction entry from the maintenance calendar. The previous performance dates (the date when the maintenance work is performed at the previous time) of all equipments are 2005 Nov. 10, and the maintenance cycles are one time/half year in the maintenance standard master illustrated in FIG. 5A. Accordingly, the maintenance planned dates are set in May when a half year has past since 2005 Nov. 10 in the maintenance calendar illustrated in FIG. 5B. The user selects the maintenance to be ordered from the maintenance calendar. Here, check marks are added to all check boxes because all maintenances are selected as targets of orders.

Next, the maintenance performance management part 108 generates a list of the maintenance contents of the target equipment selected by the user (step S1502). The maintenance performance management part 108 selects the maintenance contents by an order unit of the construction from the list of the maintenance contents, and generates the construction entry illustrated in FIG. 5C (step S1503). In an example in FIGS. 5A to 5C, all of the construction contents selected by the user (having the check mark in the check box) are included in the same order unit, and therefore, the list of the maintenance contents and the construction entry becomes the same. The specialty, the target equipment name, the maintenance contents, an operator of the construction, a construction period are registered while being corresponded with each other in the list of the maintenance contents and the construction entry.

Note that the required materials for the maintenance work of the corresponding target equipment are displayed as illustrated in FIG. 6 when a "required material" button 501 in FIG. 5A is pressed. In an example in FIG. 6, it is indicated that a material of a maker "BB", a model number of "PVQ", a component name of "hydraulic pump" is the required material in a "pump replacement" work of an equipment name of "1CAPL front surface-No. 1 hydraulic pump". Besides, it is indicated that a material of a maker "CC", a model number of "CR10000", a component name of "chain coupling" is the required material for a "coupling lubrication" work of the equipment name of "1CAPL front surface-No. 1 hydraulic pump".

FIG. 7 is a view illustrating an example of a screen displayed when a "monthly schedule" button 502 in. FIG. 5B is pressed. As illustrated in FIG. 7, the dates ("2" in this example) in May (2006) when maintenance works such as the "pump replacement", a "coupling inspection lubrication", and a "pump coupling inspection" are to be performed are displayed when the "monthly schedule" button 502 is pressed.

FIG. 8 is a view illustrating an example of construction draft information. The construction draft information is generated based on the maintenance calendar, the construction entry, and the maintenance standard master. Namely, the construction draft information is generated based on the maintenance work date of "May 2" defined at the maintenance calendar, the maintenance contents defined at the construction entry, and the presence/absence of the required materials defined at the maintenance standard master.

The generated construction draft information is sent to the operator of the construction by means of e-mail or the like. The operator performs the construction of the target equipment in accordance with the construction draft information. An orderer of the construction verifies the performed construction. Required items (construction quality, verification condition, required voucher and so on) for the construction verification are clearly defined in a construction specification and a safety specification at a construction order time, and rigidity of the verification is achieved by performing the verification in accordance with the defined contents. Verification results are inputted to the equipment total management system.

The maintenance actual performance analysis/accumulation part 109 analyses (evaluates) and accumulates a construction actual performance based on the verification results (step S1504). A schedule performance rate is analyzed from construction progress information being one of the verification results, and a failure rate is analyzed from failure information being one of the verification results in the analysis of the construction actual performance. These analysis results are accumulated as the construction actual performance.

Subsequently, the equipment master updating part 101 updates the maintenance standard master 106 based on the construction actual performance (step S1505). Specifically, for example, it is possible that the construction period of the target equipment is set to be delayed when it is judged that progress of the construction is delayed from the schedule performance rate, on the contrary, it is possible that the construction period is set to be shortened when it is judged that the progress of the construction is fast from the schedule performance rate. Besides, it is also possible to make the maintenance cycle of the target equipment short when the failure rate is high, on the contrary, it is possible to make the maintenance cycle of the target equipment long when the failure rate is low.

FIG. 16 illustrates a flow of the process of the equipment total management system for the business division of the "material management". In FIG. 16, the shopping register creating part 111 creates the shopping register by referring to the inventory standard master 110 and the maintenance calendar (step S1601).

FIG. 13 is a view illustrating a configuration example of the inventory standard master 110. As illustrated in FIG. 13, material basic information (material name, material number, unit price), a photograph of the material, the drawings and specifications, and an inventory standard by each management section and material characters are held in the inventory standard master 110. The management section means a stock room or a site where the materials are managed, and the inventory standard is a minimum inventory quantity of the materials indicated by the material basic information at the management section. Besides, the material characters are information representing a level of importance of the material indicated by the material basic information.

FIG. 9 is a view illustrating an example of the shopping register. As illustrated in FIG. 9, a purchase planned quantity by each term, and a purchase actual performance of this term as for each material are registered at the shopping register. The purchase planned quantity by each term is set from the maintenance planned date registered at the maintenance calendar, the required material information registered at the maintenance standard master, and a standard delivery date. Namely, the register with the contents is performed in which the required number of materials indicated in the required material information is ordered until the date dating back from the maintenance planned date registered at the maintenance calendar for the standard delivery date. Actually purchased contents are registered as the purchase actual performance.

The created shopping register can be displayed on the screen by the operation of the user. The user refers to the shopping register on the screen, selects the materials to be purchased, then the material order management part 112 performs an order guidance for the user. The user performs an order process in accordance with the order guidance. Specifically, the user performs the operations specifying a purchase quantity, a desired delivery date, and so on in accordance with the order guidance and determines inputted contents finally, then the material order management part 112 generates an order entry representing a material number, a name of the material, a model number of the material, the purchase quantity, the desired delivery date, and so on (step S1602).

The generated order entry is transmitted to a section purchase system. The section purchase system orders the materials in accordance with the order entry. The user gets the ordered materials. The user verifies the delivered materials and inputs a delivered quantity of the materials. Here, there are materials of which management sections are the stock room and the site among the delivered materials. The quantities of these materials are separately inputted. The inventory management purchase actual performance management part 113 registers the inputted quantity to an inventory management table of the corresponding material (step S1603).

FIG. 10 is a view illustrating a configuration example of the inventory management table. A "stock inventory amount" and a "site inventory amount" are registered by each term (−6 term to +6 term). These values are set based on the quantities separately inputted at the step S1603. An "inventory amount" is a sum of the "stock inventory amount" and the "site inventory amount". An "order on request" represents the material quantity which is currently ordered but not finally purchased yet. A "planned order" represents the material quantity for the planned order. A "usage actual performance/estimated usage" represents the material quantity which is already used or is planned to be used. A "held inventory amount estimation" represents the material quantity in which the "usage actual performance/estimated usage" is subtracted from a sum of the "inventory amount" and the "planned order". At the step S1601, an order quantity of the material is inputted at the corresponding term on the shopping register when the material quantity becomes equal to or less than the inventory standard (lower limit amount) set at the inventory standard master.

The equipment master updating part 101 updates the contents of the inventory standard master based on an updated result of the inventory management table (step S1604). For example, when it is registered to the inventory management table that there is a tendency in which a certain material is used frequently, it is possible to increase the inventory standard so as to avoid the possibility in which the corresponding material becomes out of stock, and to make an order request of the corresponding material easy to be set on the shopping register and so on.

INDUSTRIAL APPLICABILITY

In the above-stated embodiment, it is possible to avoid a possibility in which defectiveness occurs in a transfer of data by connecting input/output of calculation results of a computer in respective business steps such as, for example, a creation of an inspection calendar, an inspection performance management, a state analysis of an inspection target, and to constantly maintain standards used for an inspection, a maintenance and an inventory in an optimum state by updating an inspection standard master, a maintenance standard master, and an inventory standard master based on a state analysis result of an inspection target, a result of a maintenance work and an updated result of an inventory management table managing a material quantity in the inventory.

The invention claimed is:

1. An equipment management system, comprising a central processing unit, a memory, a storage, an input device and an output device, wherein the equipment management system is configured to:

create a maintenance calendar indicating a planned time of a maintenance work based on a maintenance standard master in which maintenance standard information at least including a maintenance cycle of the maintenance work is set;

prompt the maintenance work at the planned time of the maintenance work set at the maintenance calendar;

receive a result of the maintenance work and analyze a maintenance actual performance based on the inputted result of the maintenance work;

update the maintenance cycle set in the maintenance standard master based on analysis result;

create shopping information on a purchase planned quantity of materials by each term based on the planned date of the maintenance work set at the maintenance calendar;

accept an order of a desired material from the shopping information in accordance with an operation of a user;

receive a purchase result of the desired material;

update an inventory management table managing a quantity of the desired material in the inventory based on the purchase result; and update a lower limit amount of the desired material in the inventory set in an inventory standard master based on the quantity of the desired material managed by the inventory management table;

wherein, when the quantity of the desired material managed by the inventory management table becomes equal to or less than the lower limit amount of the desired material, an order quantity of the desired material is added into the shopping information corresponding to the desired material.

2. The equipment management system according to claim 1, further configured to:

create an inspection calendar indicating a planned time of an inspection work based on an inspection standard master in which inspection standard information at least including an inspection cycle is set;

prompt the inspection work at a planned time of the inspection work set at the inspection calendar; and receive a result of the inspection work and analyze the received result of the inspection work to determine whether or not there is a possibility that an abnormal state of an inspection target apparatus occurs, wherein the maintenance calendar is updated with the inspection cycle set in the inspection standard master based on the analysis result of the inspection work.

3. An equipment management method achieved by an equipment management system, the equipment management method comprising:

a maintenance calendar creating step of creating a maintenance calendar indicating a planned time of a maintenance work based on a maintenance standard master in which maintenance standard information at least including a maintenance cycle of the maintenance work is set;

a maintenance performance management step of prompting the maintenance work at a planned time of the maintenance work set at the maintenance calendar;

an analyzing step of inputting a result of the maintenance work and analyzing a maintenance actual performance based on the inputted result of the maintenance work;

an updating step of updating the maintenance cycle set in the maintenance standard master based on an analysis result by the analysis step;

a shopping information creating step of creating shopping information on a purchase planned quantity of materials by each term based on the planned date of the maintenance work set at the maintenance calendar;

an accepting step of accepting an order of a desired material from the shopping information in accordance with an operation of a user;

a purchase result input step of inputting a purchase result of the desired material;

an inventory management table updating step of updating an inventory management table managing a quantity of the desired material in the inventory based on the purchase result; and an inventory standard master updating step of updating a lower limit amount of the desired material in the inventory set in an inventory standard master based on the quantity of the desired material managed by the inventory management table;

wherein, when the quantity of the desired material managed by the inventory management table becomes equal to or less than the lower limit amount of the desired material, in the shopping information creating step, an order quantity of the desired material is inputted into the shopping information corresponding to the desired material.

4. A non-transitory computer-readable medium having a program stored thereon, the program having instructions for execution by a computer, wherein the instructions, when executed, cause the computer to execute:

a maintenance calendar creating step of creating a maintenance calendar indicating a planned time of a maintenance work based on a maintenance standard master in which maintenance standard information at least including a maintenance cycle of the maintenance work is set;

a maintenance performance management step of prompting the maintenance work at a planned time of the maintenance work set at the maintenance calendar;

an analysis step of inputting a result of the maintenance work and analyzing a maintenance actual performance based on the inputted result of the maintenance work;

an updating step of updating the maintenance cycle set in the maintenance standard master based on an analysis result by the analysis step;

a shopping information creating step of creating shopping information on a purchase planned quantity of materials by each term based on the planned date of the maintenance work set at the maintenance calendar;

an accepting step of accepting an order of a desired material from the shopping information in accordance with an operation of a user;

a purchase result input step of inputting a purchase result of the desired material;

an inventory management table updating step of updating an inventory management table managing a quantity of the desired material in the inventory based on the purchase result; and an inventory standard master updating step of updating a lower limit amount of the desired material in the inventory set in an inventory standard master based on the quantity of the desired material managed by the inventory management table;

wherein, when the quantity of the desired material managed by the inventory management table becomes equal to or less than the lower limit amount of the desired material, in the shopping information creating step, an order quantity of the desired material is inputted into the shopping information corresponding to the desired material.

* * * * *

UNITED STATES PATENT AND TRADEMARK OFFICE
CERTIFICATE OF CORRECTION

| | |
|---|---|
| PATENT NO. | : 8,626,610 B2 |
| APPLICATION NO. | : 12/998188 |
| DATED | : January 7, 2014 |
| INVENTOR(S) | : Ichiro Kodama et al. |

It is certified that error appears in the above-identified patent and that said Letters Patent is hereby corrected as shown below:

In the Specification

Column 4, line 56, change "co1 1ection" to -- collection --;

Column 10, line 42, change "orderer" to -- order --.

Signed and Sealed this
Second Day of September, 2014

Michelle K. Lee
*Deputy Director of the United States Patent and Trademark Office*